United States Patent
Mizell et al.

(10) Patent No.: US 7,343,158 B2
(45) Date of Patent: Mar. 11, 2008

(54) HOME AGENT REDIRECTION FOR MOBILE IP

(75) Inventors: Jerry Mizell, Plano, TX (US); David J. Lauson, McKinney, TX (US); Peter Wenzel, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 693 days.

(21) Appl. No.: 10/417,455

(22) Filed: Apr. 16, 2003

(65) Prior Publication Data

US 2004/0208187 A1 Oct. 21, 2004

(51) Int. Cl.
*H04Q 7/24* (2006.01)
*H04L 12/66* (2006.01)

(52) U.S. Cl. .................. 455/435.1; 370/338; 370/352; 455/433; 455/435.2; 455/445

(58) Field of Classification Search ............... 370/338, 370/351, 352; 455/414.1, 417, 432.1, 432.2, 455/432.3, 433, 435.1, 435.2, 435.3, 436, 455/445
See application file for complete search history.

(56) References Cited

U.S. PATENT DOCUMENTS

| | | | | |
|---|---|---|---|---|
| 6,160,804 A * | 12/2000 | Ahmed et al. | ............... | 370/349 |
| 6,363,251 B1 * | 3/2002 | Huang et al. | ............ | 455/432.1 |
| 6,560,217 B1 * | 5/2003 | Peirce et al. | ................. | 370/351 |
| 6,594,498 B1 * | 7/2003 | McKenna et al. | .......... | 455/517 |
| 6,708,031 B2 * | 3/2004 | Purnadi et al. | ............. | 455/436 |
| 6,891,819 B1 * | 5/2005 | Inoue et al. | ................. | 370/338 |
| 6,892,069 B1 * | 5/2005 | Flynn | ...................... | 455/432.1 |
| 7,106,710 B1 * | 9/2006 | Smith | ......................... | 370/331 |
| 7,230,951 B2 * | 6/2007 | Mizell et al. | ................ | 370/401 |
| 2002/0018456 A1 * | 2/2002 | Kakemizu et al. | .......... | 370/338 |
| 2002/0067704 A1 * | 6/2002 | Ton | ............................ | 370/329 |
| 2003/0039234 A1 * | 2/2003 | Sharma et al. | ............. | 370/338 |
| 2003/0091013 A1 * | 5/2003 | Song et al. | ................. | 370/338 |
| 2004/0002337 A1 * | 1/2004 | Wheeler et al. | ............ | 455/445 |

* cited by examiner

*Primary Examiner*—Harry S. Hong
(74) *Attorney, Agent, or Firm*—Garlick, Harrison & Markison; James A. Harrison

(57) ABSTRACT

A method and apparatus are provided for dynamically redirecting mobile terminal home agent selection in a mobile IP network. A provisioning server assigns a preferred home agent to a group of mobile terminals based on one of a subscriber special services, subscriber connectivity, and home agent capacity. The provisioning server transmits the preferred home agent address to a home authentication, authorization, and accounting (AAA) server which updates a AAA database. The mobile terminal seeking access to the mobile IP network first registers with a configured home agent address stored in the mobile terminal. The configured home agent communicates with the home AAA server to authenticate the mobile terminal. The home AAA server fails the mobile terminal authentication request and provides the address of the preferred home agent. The mobile terminal reregisters with the preferred home agent to access the mobile IP network.

19 Claims, 6 Drawing Sheets

Communication network

HOME AGENT REDIRECTION FOR MOBILE IP

BACKGROUND OF THE INVENTION

1. Technical Field of the Invention

The present invention relates to mobile communication devices and, more particularly, the present invention relates to mobile terminals in a mobile IP network.

2. Description of Related Art

Wireless communication service providers, as well as Internet service providers, face some difficult challenges as the various networks are increasingly modified to work together to provide seamless end-to-end call connectivity across the various platforms. Ever-increasing residential dial-up subscribers demand available modem (or ISDN) ports, or threaten to take their business elsewhere. To meet this demand, Internet service providers are deploying a large number of complex, port-dense network access servers (NAS) to handle thousands of individual dial-up connections. As such, small and large, as well as private and public, wireless data networks are being created to seamlessly interact with large wire line networks to enable users to establish point-to-point connections independent of terminal type and location. Traditionally, however, voice networks have paved the way for the creation of data networks as users loaded the voice networks trying to transmit data, including streaming data (video and voice). Initially, traditional Public Switched Telephone Networks (PSTNs) were used for data transmissions but have been largely supplanted by data packet networks, including various versions of the "Internet".

The wireless domain has had a parallel history. Initial voice networks, including AMPS, Time Division Multiple Access (TDMA) including North American TDMA and Global System for Mobile Communications (GSM), were used to conduct data in a limited capacity. These networks are being replaced, however, by newer wireless data-only networks, as well as data and voice networks.

The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, MAC layer operations, link layer operations, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area. Typically, these channels are equally spaced across the licensed spectrum. The separation between adjacent carriers is defined by the operating standards and is selected to maximize the capacity supported within the licensed spectrum without excessive interference. In most cases, severe limitations are placed upon the amount of co-channel and adjacent channel interference that maybe caused by transmissions on a particular channel.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results.

Traditional wireless mobile networks include Mobile Station Controllers (MSCs), Base Station Controllers (BSCs) and Base Transceiver Station (BTS) systems that jointly operate to communicate with mobile stations over a wireless communication link. Examples of common networks include the GSM networks, North American TDMA networks and Code Division Multiple Access (CDMA) networks. Extensive infrastructures (e.g., ANSI-41 or MAP-based networks) exist in the cellular wireless networks for tracking mobility, distributing subscriber profiles, and authenticating physical devices.

To establish a wireless communication link in traditional wireless voice networks, an MSC communicates with a BSC to prompt the BTS (collectively "Base Station" or "BS") to generate paging signals to a specified mobile station within a defined service area typically known as a cell or sector (a cell portion). The mobile station, upon receiving the page request, responds to indicate that it is present and available to accept an incoming call. Thereafter, the BS, upon receiving a page response from the mobile station, communicates with the MSC to advise it of the same. The call is then routed through the BS to the mobile station as the call setup is completed and the communication link is created. Alternatively, to establish a call, a mobile station generates call setup signals that are processed by various network elements in a synchronized manner to authenticate the user as a part of placing the call. The authentication process includes, for example, communicating with a Home Location Register (HLR) to obtain user and terminal profile information.

Mobile IP networks create the ability for mobile terminals to receive and transmit data. For example, many new mobile terminals (MT) or access terminals (AT), are being developed to enable a user to surf the web or send and receive e-mail messages through the wireless mobile terminal, as well as to be able to receive continuous bit rate data, including so called "streaming data". These mobile IP terminals access the mobile IP network through home agents that act as servers between the mobile terminal and the home network. The home agent address is stored in the mobile terminal. High volumes of network traffic create bottle necks when mobile terminals seek access to heavily load home agents even though lightly loaded home agents are available. The configuration-based home agent selection cannot be easily changed.

What is need, therefore, is an apparatus and a method to readily change home agent selection based on network conditions.

BRIEF SUMMARY OF THE INVENTION

Dynamic redirection of mobile terminal home agent selection in a mobile IP network is disclosed by the present invention. A mobile terminal seeking access to the mobile IP network must register with a home agent responsible for authenticating the mobile terminal and functioning as a server for the mobile terminal and a home network. The home agent details are maintained in a configuration file within the mobile terminal. The home agent communicates with a home authentication, authorization, and accounting (AAA) server to verify the identity of the mobile terminal prior to granting access to the mobile IP network.

A provisioning server generates preferred home agents for a group of mobile terminals that are to be redirected from a configured HA to a preferred HA based on one of a subscriber services, subscriber connectivity, and a home agent capacity. The provisioning server transmits the preferred HA information to the AAA server which updates the mobile terminal's subscriber profile. For a mobile terminal of the group of mobile terminals that are to be redirected, generating a registration request results in a failed registration response containing the address of the preferred HA. The mobile terminal will reregister using the address of the preferred HA thus completing the dynamic home agent redirection.

Other features and advantages of the present invention will become apparent from the following detailed description of the invention made with reference to the accompanying drawings.

BRIEF DESCRIPTION OF THE SEVERAL VIEWS OF THE DRAWINGS

A better understanding of the present invention can be obtained when the following detailed description of the preferred embodiment is considered with the following drawings, in which.

DETAILED DESCRIPTION OF THE INVENTION

Figure 1:
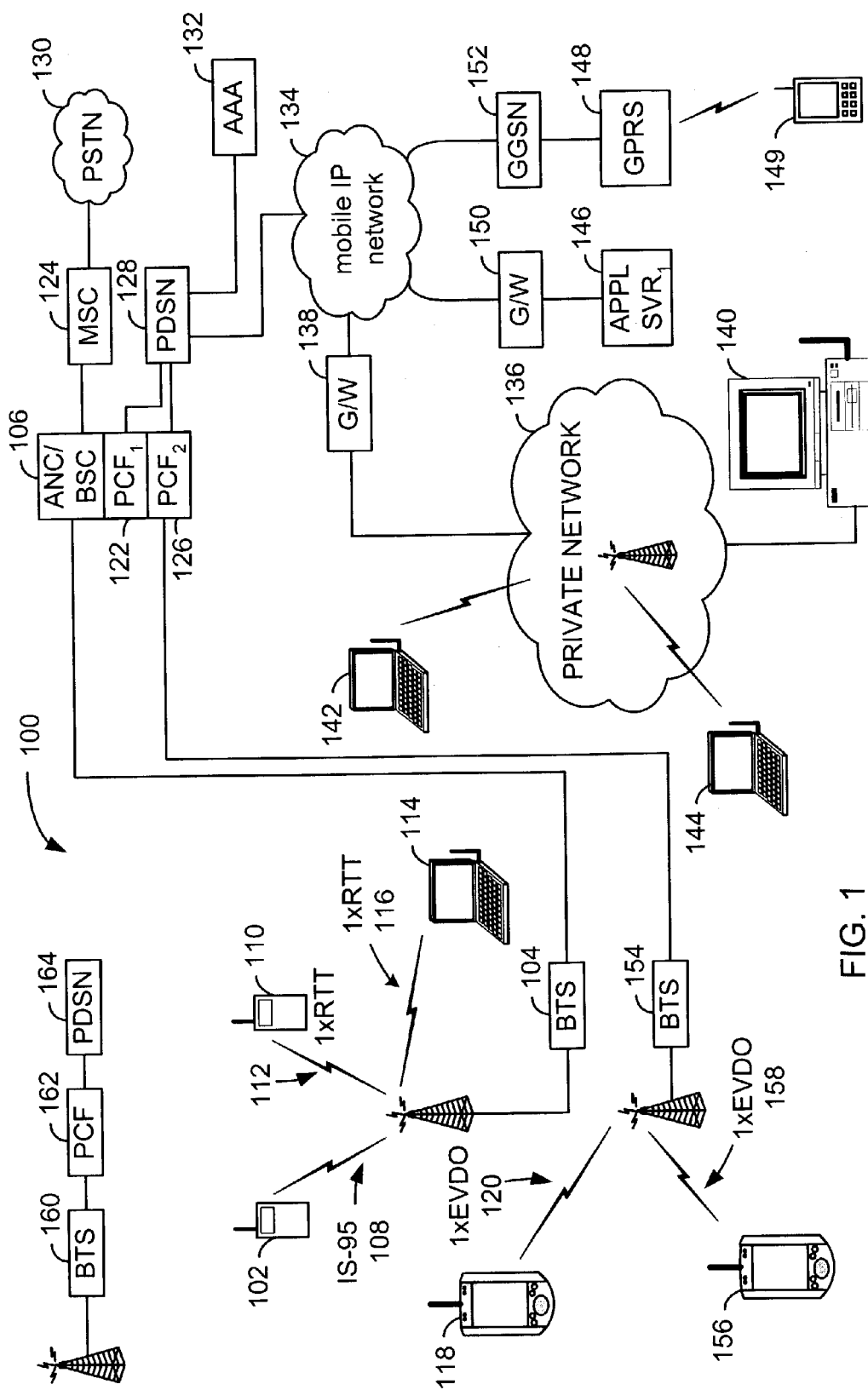
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private network to communicate with a mobile terminal through a wireless communication link. Such transparent operation with respect to the user is improving access to information and the ability for individuals to communicate to a level that is unprecedented. Existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to an Access Network Controller (ANC)/Base Station Controller (BSC) 106. More specifically, mobile station 102 communicates with BTS 104 by way of an IS-95 CDMA wireless communication network link shown generally at 108. Similarly, a mobile terminal 110 that is capable of supporting both voice and data calls communicates with BTS 104 over a wireless communication link shown generally at 112 and establishes either voice calls or data calls under CDMA2000 1xRTT protocols. In the example herein, mobile terminal 110 is engaged in a voice call, as defined by a service option generated by a mobile terminal during call setup, and thus wireless communication link 112 is transmitting merely voice signals and associated control signaling.

Similarly, a mobile terminal 114 is engaged in a data call (data session) according to 1xRTT protocols over a wireless communication link shown generally at 116. Finally, an access terminal 118 is engaged in a data session over a wireless communication link, shown generally at 120, according to 1xEV-DO protocols in a so called "simple-IP" or "mobile-IP" network, as those terms are understood by one of average skill in the art. In general, simple-IP and mobile-IP networks do not include control-signaling protocols that are as extensive as some existing systems. In particular, simple-IP and mobile-IP networks do not include a "heartbeat" mechanism used to determine that a wireless terminal is present and operational.

Continuing to examine FIG. 1, BTS 104 is generally coupled to communicate with ANC/BSC 106 (or with packet control function cards there within). As is understood by one of average skill in the art, access network controllers and base station controllers have similar functionality. Moreover, Packet Control Function (PCF) cards can be installed either within a BSC or within an ANC according to whether the PCF is to communicate with a 1xRTT device or a 1xEV-DO device, respectively. It is to be understood that the BSC and ANC elements may readily be formed as stand alone units, but are shown herein as combined systems for illustration.

Within ANC/BSC 106, a plurality of different wireless network cards is included to facilitate communications with mobile stations and mobile terminals of differing protocols and types. For example, in the described embodiment, ANC/BSC 106 includes circuitry to communicate with mobile station 102 over IS-95 CDMA wireless communication network link as shown generally at 108. ANC/BSC 106 further includes a PCF 122 for communicating with mobile terminals 110 and 114 utilizing 1xRTT protocols. As may be seen, PCF 122, which is for communicating with 1xRTT protocol devices, is coupled to a Mobile Switching Center (MSC) 124. A PCF 126, however, is for communicating with 1xEV-DO devices and thus it is coupled directly to a Packet Data Serving Node (PDSN) 128. Thus, access terminal 118 that communicates over wireless communication link 120 according to 1xEV-DO communication protocols, communicates with BTS 154 and with PCF 126 formed within ANC/BSC 106. It is understood, of course, that PCF 126 may readily be formed as a distinct device rather than within a rack of ANC/BSC 106. Moreover, PCF 126 may communicate with access terminal 118 through distinct radio equipment and, thus, through a BTS other than BTS 154 as shown herein.

MSC 124 further is coupled to a Public Switched Telephone Network (PSTN) 130. Accordingly, calls routed through MSC 124 are directed either to other MSCs (not shown herein) or to external networks by way of PSTN 130. The reference to PSTN herein includes SS7 and other similar "intelligent networks". Thus, a gateway device (not shown herein) coupled to PSTN 130, may be used to access a data packet network, such as the Internet, for any data calls transmitted according to 1xRTT protocols. 1xEV-DO calls, which are processed by PCF 126, however, are forwarded through PDSN 128, which, upon authentication by an Authentication, Authorization and Accounting (AAA) server 132, is connected to a data packet network, which, in this example, comprises mobile IP network 134. As may further be seen, mobile IP network 134 is coupled to a private network 136 by way of a gateway device 138. Private network 136 further is coupled through traditional wire line networks to a user terminal 140. Private network 136 is further coupled to mobile terminals 142 and 144 through a wireless network.

Mobile IP network 134 further is coupled to application server 146 by way of gateway device 150. A Global System for Mobile Communications (GSM) mobile terminal 149 is coupled to mobile IP network 134 by way of a General Packet Radio Service (GPRS) network 148. GPRS 148 represents the GPRS architecture such as base station controller, mobile switching center, and serving support nodes. Gateway GPRS Support Node (GGSN) 152 is the interface between mobile IP network 134 and GPRS 148.

Continuing to refer to FIG. 1, ANC/BSC 106 further is coupled to BTS 154, which is in communication with an access terminal 156 by way of a 1xEV-DO communication link 158. As may be seen, access terminal 156 is served by PCF 126, as is access terminal 118. Additionally, a BTS 160 is coupled to a PCF 162 that, in turn, is coupled to communicate with a PDSN 164. Thus, a mobile station, such as mobile station 102, may communicate with BTS 160, BTS 104, or both. PCF 162, as may be seen, is a standalone system rather than being integrated as a card in an ANC or a BSC.

Any one of the mobile terminals or access terminals may also communicate with mobile IP network 134 through a configured home agent (HA) or a mobile IP access point. The mobile terminal will register with the configured HA stored within the mobile terminal. The configured HA will request authentication from an authentication, authorization, and accounting (AAA) server. In the described embodiment, a provisioning server will assign a preferred HA to a group of mobile terminals according to one of a subscriber special services, subscriber connectivity, and HA capacity. The AAA server will send an authentication response containing the preferred HA and an authentication failure message for the mobile terminal of the group of mobile terminals. The mobile terminal, upon receiving the authentication failure message, will re-register with the mobile IP network using the preferred HA address. This dynamic allocation of home agents allows the network to distribute network traffic to a plurality of home agents thereby reducing the amount of traffic transported by the home agent.

Typically, a mobile terminal is assigned to a specified home agent and is configured to register with the specified home agent (hereafter, the configured home agent. Accordingly, to change the configured home agent for a group of mobile terminals, each mobile terminal must be reconfigured. Thus the prior art process is labor intensive and not easily performed. Thus, the present invention provides a method for readily changing the preferred home agent for a group of mobile terminals.

Figure 2:
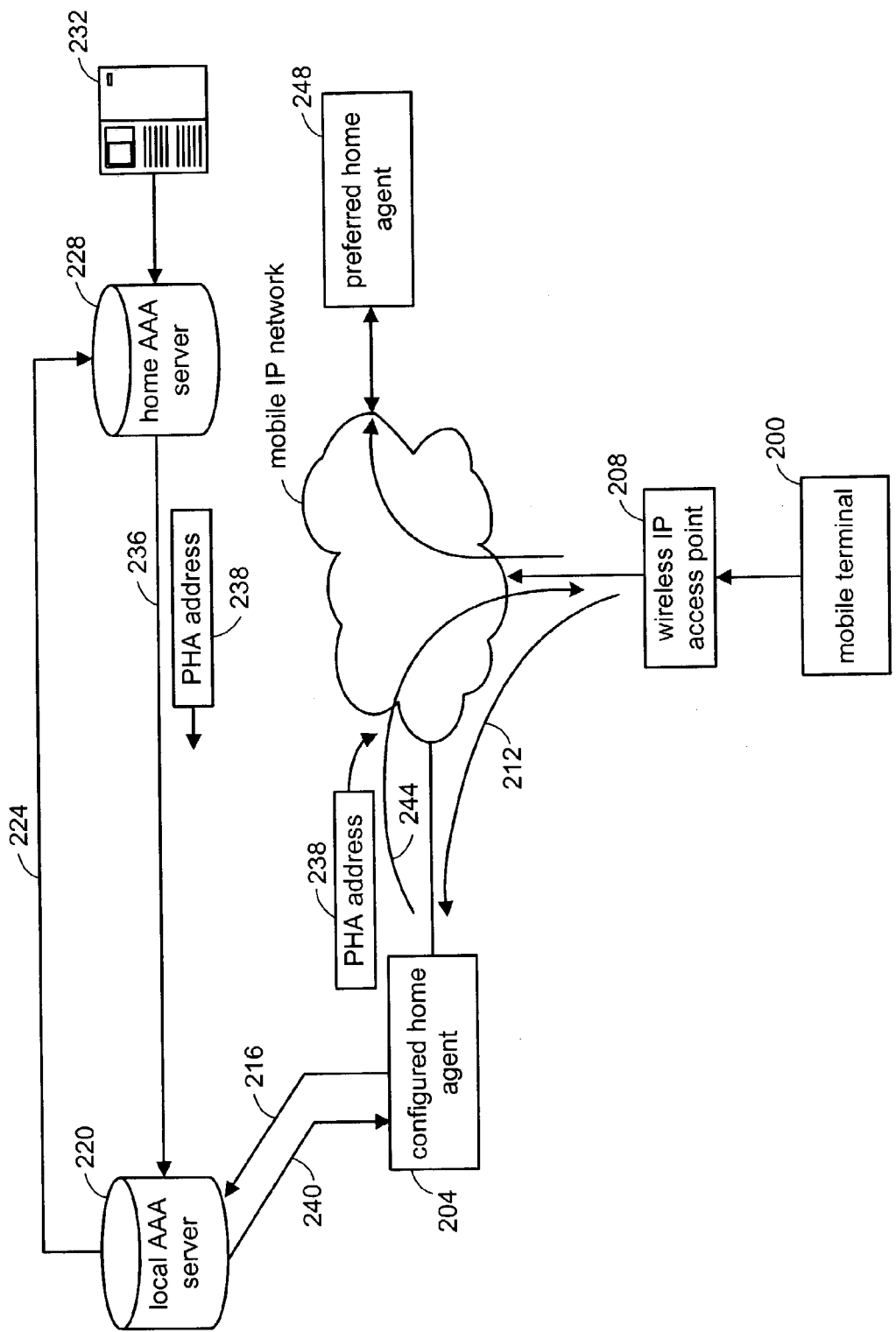
FIG. 2 is a functional block diagram illustrating home agent redirection for mobile IP according to one embodiment of the present invention.

FIG. 2 is a functional block diagram illustrating home agent redirection for mobile internet protocol (IP) according to one embodiment of the present invention. Mobile IP is the set of extensions needed for the Internet to support the mobility of mobile terminals. Each mobile terminal has a configured home agent (HA) that provides services for the mobile terminal and the mobile terminal's home network. The home network is a range of IP addresses comprising the mobile terminal IP address. Mobile terminals seeking access to a mobile IP network must register with the configured home agent whose address is stored in a mobile terminal configuration file. The mobile terminal registers by sending a registration request containing the mobile terminal address, HA address, and identification data in a data packet. As illustrated in FIG. 2, mobile terminal 200 connects to a mobile IP network through a wireless IP access point 208 by generating registration request 212 containing the address of the configured home agent. Wireless IP access point 208 is a network device that provides a connection between a wireless network and a wired local area network (LAN). Prior to granting the registration request, the configured home agent will authenticate the identity of the mobile terminal by accessing the mobile terminal subscriber profile stored in an authentication, authorization, and accounting (AAA) database. Configured home agent 204 sends an authentication request 216 to local AAA server 220. Local AAA server 220 proxies authentication request 216 (signal 224) to home AAA server 228 that will access the AAA database for mobile terminal 200 subscriber profile information.

At this point, the method of the present invention allows for dynamic allocation of home agents based on, in part, home network traffic and network services defined in the subscriber profile. Provisioning server 232 provides preferred home agents addresses for a group of mobile terminals to home AAA server 228. Preferred home agents are home agents that provided special services (e-mail, IP telephony) subscribed to by a mobile terminal. Preferred home agents may also be assigned based on home agent network traffic. Accordingly, the provisioning server will redirect network traffic from a heavily loaded home agent to a more lightly loaded home agent. Home AAA server 228 stores the preferred home agent information in the subscriber profile for mobile terminals in the group of mobile terminals. When the home AAA server receives the authentication request, it compares the configured home agent address with the preferred home agent address. A favorable comparison causes the home AAA server to return an authentication failure message. The authentication failure message identifies the mobile terminal as being part of the group of mobile terminals that have assigned preferred home agents. Authentication response 236 contains mobile terminal 200 subscriber profile information, preferred home agent (PHA) address 238, and the authentication failure message. Local AAA server 220 sends authentication response 240, containing the address of preferred home agent 240, to configure home agent 204. Due to the presence of the authentication failure message and the preferred home agent address in authentication response 240, configured home agent 204 fails the registration request by sending registration response 244 containing PHA address 238.

Mobile terminal 200 will generate a new registration request using the address of preferred home agent 248. In one embodiment of the present invention, the mobile terminal will always register with the configured home agent when it accesses the mobile IP network. In an alternate embodiment, the mobile terminal will store the preferred home agent in a configuration file and use the stored preferred home agent until a new home agent is stored.

One objective of the present invention is to dynamically redirect home agents according to metrics such as traffic load and subscriber profile information. A provisioning server can dynamically allocate additional home agents according to traffic load on the configured HA by assigning the mobile terminal to a different home agent as demanded by network conditions.

Figure 3:
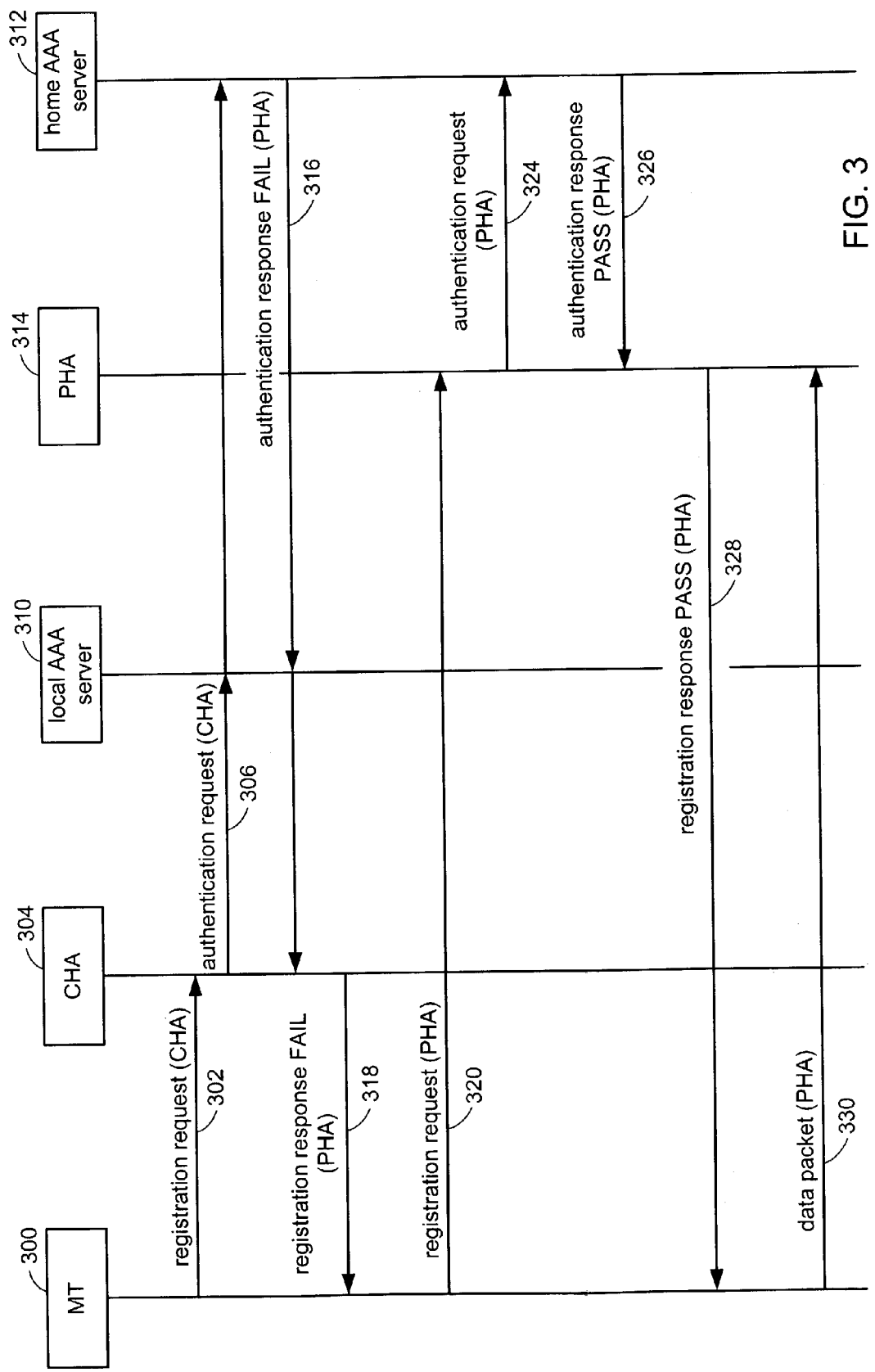
FIG. 3 is a signal sequence diagram that illustrates one embodiment of the present invention.

FIG. 3 is a signal sequence diagram that illustrates one embodiment of the present invention. A mobile terminal seeking access to a mobile IP network registers with a configured home agent maintained in the mobile terminal. As illustrated, mobile terminal 300 initiates a registration request 302 containing the address of configured home agent 304, HA1. HA1 transmits an authentication request 306 to local authentication, authorization and accounting (AAA) server 310 wherein authentication request 306 is forwarded to a home AAA server 312. The authentication request is a means for identifying the mobile terminal and to establish accounting for services used. Home AAA server 312 access a home AAA database (not shown) to access the mobile terminal subscriber profile. The subscriber profile contains mobile terminal information including an assigned home agent. The present invention dynamically redirects mobile terminal home agents based on home agent traffic and subscriber profile by changing the home agent address in the subscriber profile. A provisioning server (not shown) determines the mobile terminal is of a group of mobile terminals redirected to a preferred HA, HA2 314 in this illustration, and transmits the preferred HA address to the home AAA server. Home AAA server updates the mobile terminal's subscriber profile maintained in the home AAA database.

Home AAA server 312 compares the HA address (HA1) received with the authentication request to the address stored in the subscriber profile (address of HA2). A failed comparison prompts home AAA server 312 to transmit authentication response 316 containing the address of HA2, the mobile terminal subscriber profile and an authentication failure message back to local AAA server 310.

Local AAA server forwards the failed authentication response to the configured HA1 which then transmits registration response failure 318 including the address of preferred home agent HA2. In general, the registration response is a reply from the HA to the mobile terminal used to complete the registration process. In one embodiment, the mobile terminal uses the preferred HA address until the next registration request. In an alternate embodiment, the mobile terminal stores the preferred HA address internally replacing the configured home agent.

After receiving the failed registration request, mobile terminal 300 issues registration request 320 containing the address of HA2. Upon receiving registration request 320, HA2 issues authentication request 324 to home AAA server 312 which will return an authentication response PASS 326 to HA2 314. Mobile terminal 300 receives a registration response PASS 328 from HA2. MT 300 sends data packet 330 to HA2 314 for routing to the mobile IP network.

Figure 4:
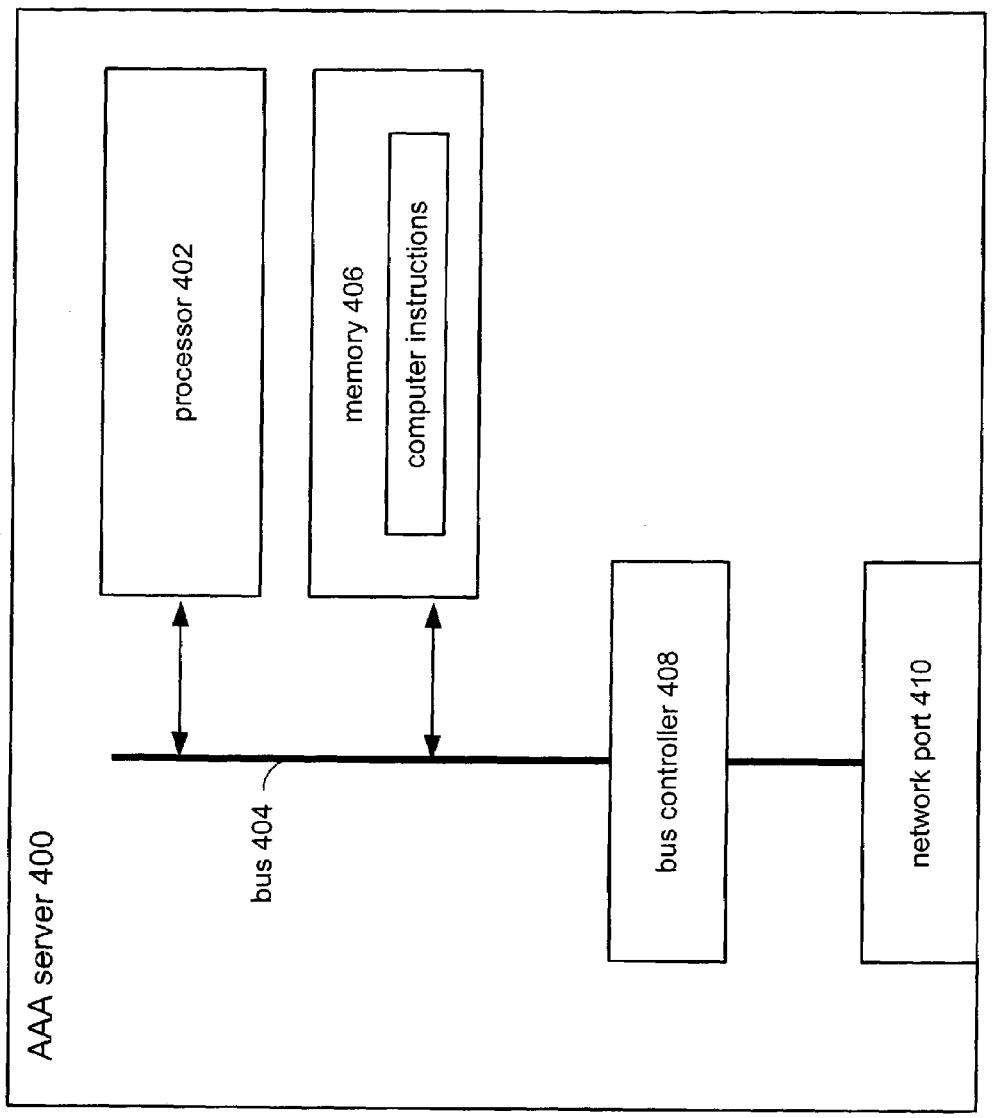
FIG. 4 is a functional block diagram of an authentication, authorization and accounting (AAA) server that illustrates one embodiment of the present invention.

FIG. 4 is a functional block diagram of an authentication, authorization and accounting (AAA) server that illustrates one embodiment of the present invention. AAA server 400 includes a processor 402 that is coupled to communicate over a bus 404. A memory 406 further is coupled to bus 404 and is for storing computer instructions that define the operational logic of AAA server 400. Bus 404 further is coupled to a bus controller 410, which controls the communications and timing of communications thereon. Bus controller 410 is further coupled to a network port 412 that enables AAA server 400 to communicate with network elements of a mobile IP network.

In operation, processor 402 communicates with memory 406 by way of bus 404 to retrieve computer instructions stored therein and to execute the computer instructions to operate according to the logic defined within the computer instructions of memory 406. Memory 406 includes computer instructions that define logic for verifying an authentication request of a mobile terminal for the HA specified by the mobile terminal. Memory 406 also includes computer instructions that define the logic for receiving and processing preferred HA addresses for a group of mobile terminals from an external provisioning server. Processor 402, operating on instructions stored in memory 406, updates mobile terminal subscriber profiles to include the preferred HA for the group of mobile terminals.

Memory 406 further includes instructions defining logic to compare the received mobile terminal configure HA to the preferred HA stored in the subscriber profile. If the comparison fails then a failed authentication response will contain the preferred HA address. The mobile terminal, upon receiving a failed registration response, including the preferred HA address, will register with the preferred HA.

Figure 5:
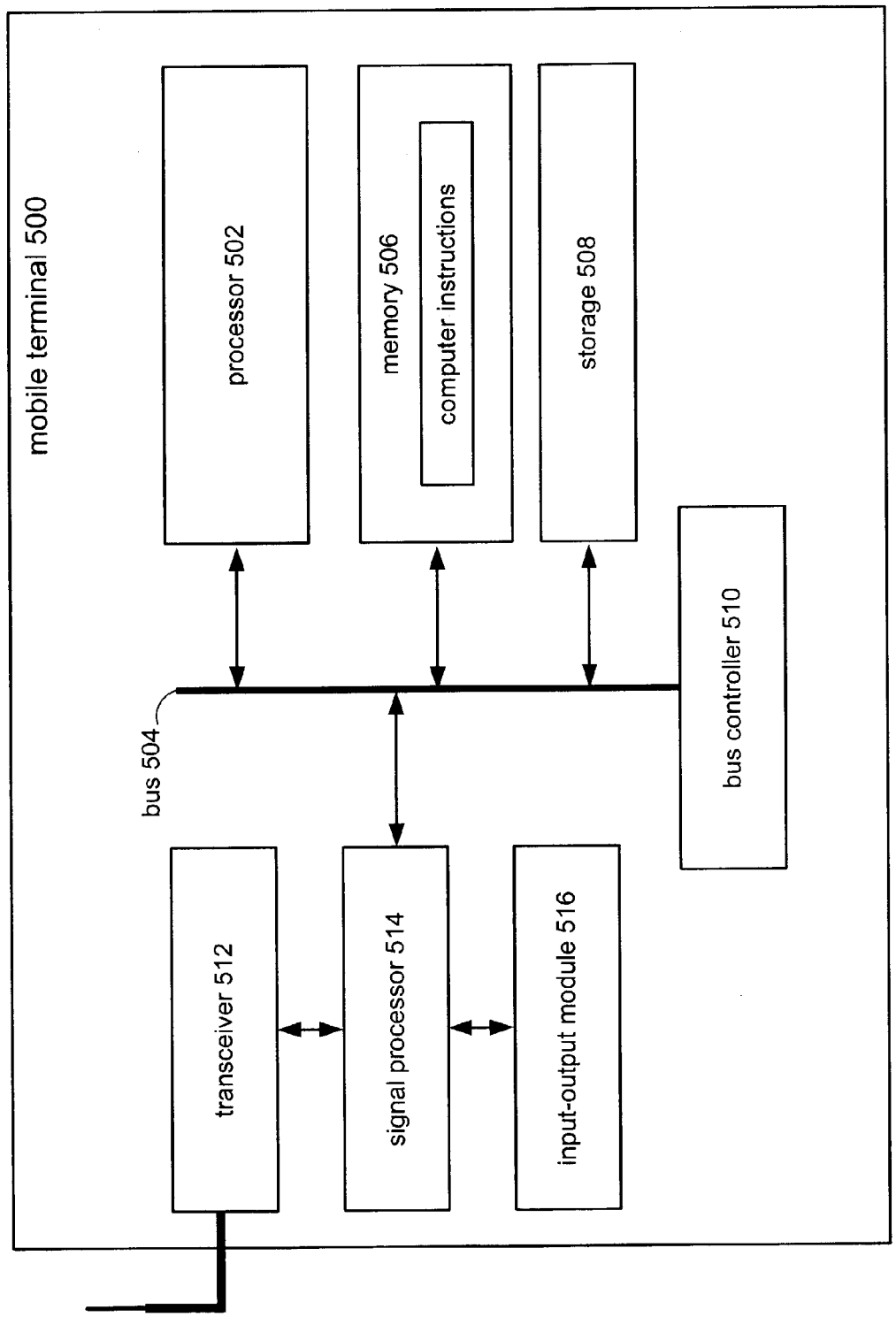
FIG. 5 is a functional block diagram of a mobile terminal illustrating one embodiment of the present invention.

FIG. 5 is a functional block diagram of a mobile terminal according to one embodiment of the present invention. Mobile terminal 500 includes a processor 502 that is coupled to communicate over bus 504. Memory 506 further is coupled to bus 504 and is for storing computer instructions that define the operational logic of mobile terminal 500. Bus 504 is further coupled to a bus controller 510, which controls the communications and timing of communications thereon. Bus controller 510 is further coupled to storage 508. Storage 508 is a non-volatile memory area, such as flash memory, used to store a configured home agent (HA) address, mobile terminal information, and other data.

Mobile terminal 500 further comprises a transceiver 512, a signal processor 514, and input-output 516. Transceiver 512 comprises the circuitry for transmitting and receiving a RF signal as well as performing modulation, demodulation, frequency conversion, and amplification of received and transmitted RF signals. Signal processor 514 performs analog-to-digital conversion (ADC), digital-to-analog conversion (DAC), and other signal processing functions as is known by one of average skill in the art. Input-output 516 comprises human interface devices such as keyboard, speaker, microphone, and one or more display devices.

In operation, processor 502 communicates with memory 506 by way of bus 504 to retrieve computer instructions stored therein and to execute the computer instructions to operate according to the logic defined within the computer instructions of memory 506. Memory 506 includes computer instructions that define logic for transmitting an authentication request to the configured HA maintained in storage 508. Memory 506 also includes computer instructions that define the logic for receiving and processing a preferred HA addresses received with a failed registration response. Processor 502, operating on instructions stored in memory 506, updates the mobile terminal configuration table to include the preferred HA.

Figure 6:
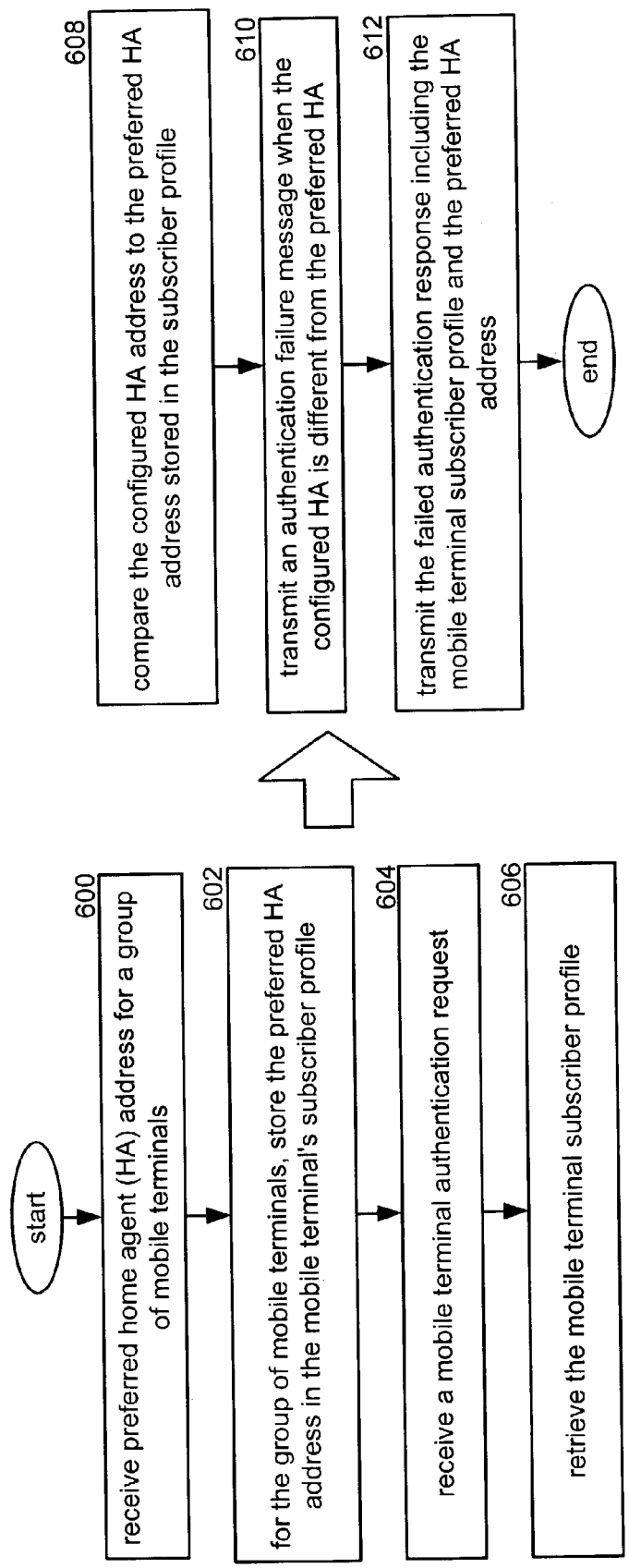
FIG. 6 is a flow chart illustrating a method of an authentication, authorization, and accounting (AAA) server according to one embodiment of the present invention.

Memory 506 further includes instructions defining logic to prompt processor 502 to transmit a new registration request, containing the address of the preferred HA, upon receiving the failed registration response. In one embodiment of the present invention, computer instructions stored in memory 506 define logic prompting processor 502 to overwrite the configure HA address in storage 508 with the address of the preferred HA FIG. 6 is a flow chart illustrating a method of an authentication, authorization, and accounting (AAA) server according to one embodiment of the present invention. The AAA server is responsible for accessing and maintaining an AAA database containing mobile terminal subscriber profiles. A mobile terminal seeking to access a mobile internet protocol (IP) network will register with a home agent (HA) stored within the mobile terminal. The HA will access the AAA server associated with the home network of the HA to authenticate the mobile terminal. One objective of the present invention is to dynamically redirect home agents according to metrics such as traffic load and subscriber profile. A provisioning server can dynamically allocate additional HAs according to traffic load on a configured HA by assigning a preferred HA to a group of mobile terminals.

The AAA server receives the preferred HA addresses for a group of mobile terminals (step 600) and stores the preferred HA in the mobile terminal's subscriber profile (step 602). When the mobile terminal accesses the mobile IP network, it will send a registration request to the configured HA stored in the mobile terminal wherein the configured HA generates an authentication request. The AAA server receives the mobile terminal authentication request (step 604) then retrieves the mobile terminal subscriber profile (step 606) from the AAA database. The AAA server will compare the configured HA contained in the authentication request to the preferred HA stored in the subscriber profile (step 608) and will transmit an authentication failure message when the configured HA is different from the preferred HA (step 610). The AAA server will transmit the failed authentication response including the mobile terminal subscriber profile and the preferred HA address (step 612). When the mobile terminal receives a failed registration request from the configured HA, it will re-register with the preferred HA address provided by the AAA server. As each mobile terminal, of the group of mobile terminals, accesses the mobile IP network, the mobile terminal will be dynamically re-directed to the preferred HA.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed:

1. A mobile IP network, comprising:
   a home authentication, authorization and accounting (AAA) server for receiving authentication requests and for generating authentication responses;
   a configured home agent (HA);
   a mobile terminal for connecting to the mobile IP network by way of the configured HA;
   a local AAA server for communicating with the home AAA server to authenticate the mobile terminal seeking access to the mobile IP network by way of the configured HA, the local AAA server coupled to the communicate with the configured HA and with the home AAA server;
   a provisioning server coupled to provide preferred HA addresses for a group of mobile terminals to the home AAA server; and
   wherein:
      the mobile terminal specifies the configured home agent when seeking access to the mobile IP network through an access point, the configured home agent address being stored within the mobile terminal;
      the home AAA server, responsive to having received the preferred HA addresses for the group of mobile terminals including the mobile terminal, sends an authentication response to the local AAA server, the authentication response including the preferred HA address for the mobile terminal; and
      the local AAA server, responsive to receiving the authentication response from the home AAA server, generates an authentication failure message to the mobile terminal, the authentication failure message including the preferred HA address.

2. The mobile IP network of claim 1 wherein the mobile terminal, upon receiving the authentication failure message with the preferred HA address, generates a registration request including the preferred HA address.

3. The mobile IP network of claim 1 wherein the home AAA server, upon receiving the authentication request, accesses a mobile terminal subscriber profile defining one of a subscriber special services and subscriber connectivity.

4. The mobile IP network of claim 3 wherein the provisioning server selects the preferred HA address based, in part, on one of the subscriber special services, subscriber connectivity, and HA network capacity.

5. The mobile IP network of claim 1 wherein the AAA server updates the mobile terminal subscriber profile to reflect the preferred HA address.

6. An authentication, authorization and accounting (AAA) server for use in a mobile IP network, the AAA server comprising:
   a processor for executing computer instructions that define operational logic of the AAA server;
   a bus coupled to the processor for transmitting computer instructions and control signals to and from the processor within the AAA server;
   a network port for communicating with external devices coupled to the mobile IP network;
   memory coupled to the bus, the memory including the computer instructions that define operational logic for receiving and processing preferred HA addresses for a group of mobile terminals from an external provisioning server;
   the memory further including computer instructions that define logic for generating an authentication response including an address of the preferred HA to a local AAA server.

7. The AAA server of claim 6 further including logic to prompt the processor to compare a received mobile terminal configured HA to the mobile terminal subscriber profile preferred HA as part of generating the authentication response.

8. A mobile terminal for communication through a mobile IP network, comprising:

a processor for executing computer instructions that define operational logic of the mobile terminal;

a bus coupled to the processor for transmitting computer instructions and control signals to and from the processor within the mobile terminal;

memory coupled to the bus, the memory including the computer instructions that define operational logic for receiving and processing a preferred HA address for the mobile terminal;

the memory further including computer instructions that define logic for regenerating an access request including the preferred HA address.

9. The mobile terminal of claim 8 wherein the memory further includes logic for receiving and storing the HA address for future access request.

10. The mobile terminal of claim 8 wherein the memory further includes logic for retrieving the stored the HA address and for generating an access request with the stored HA address.

11. A method in an authentication, authorization, and accounting (AAA) server for dynamically redirecting home agents in a mobile IP network, comprising:

receiving preferred home agent (HA) addresses for a group of mobile terminals;

for the group of mobile terminals, storing the preferred home agent address in the mobile terminal subscriber profile;

receiving a mobile terminal authentication request;

retrieving the mobile terminal subscriber profile; and transmitting an authentication response including the mobile terminal subscriber profile.

12. The method of claim 11 wherein transmitting an authentication response farther includes comparing the configured HA defined in the authentication request to the preferred HA stored in the subscriber profile.

13. The method of claim 12 wherein transmitting the authentication response includes transmitting an authentication failure message when the configured HA is different from the preferred HA.

14. The method of claim 11 wherein transmitting the authentication response further includes returning the mobile terminal preferred HA address.

15. A method for dynamically redirecting mobile terminal home agent (HA) selection in an IP network, comprising;

assigning a preferred HA to the terminal in accordance with prescribed criteria;

updating a profile associated with the mobile terminal with the preferred HA;

receiving a mobile terminal authentication request;

accessing the updated profile; and redirecting the mobile terminal in accordance with the preferred HA assignment.

16. The method of claim 15, including the mobile IP network first registering with a configured home agent address stored in the mobile terminal.

17. The method of claim 15, including the configured home agent communicating with the home AAA server to authenticate the mobile terminal.

18. The method of claim 15, including the home AAA server failing the mobile terminal authentication request and providing the address of the preferred home agent.

19. The method of claim 15, including the mobile terminal reregistering with the preferred home agent to access the mobile IP network.

* * * * *